(No Model.) 2 Sheets—Sheet 1.
D. D. JOHNSON.
APPARATUS FOR OBTAINING LIQUID CARBON DIOXIDE.
No. 370,703. Patented Sept. 27, 1887.
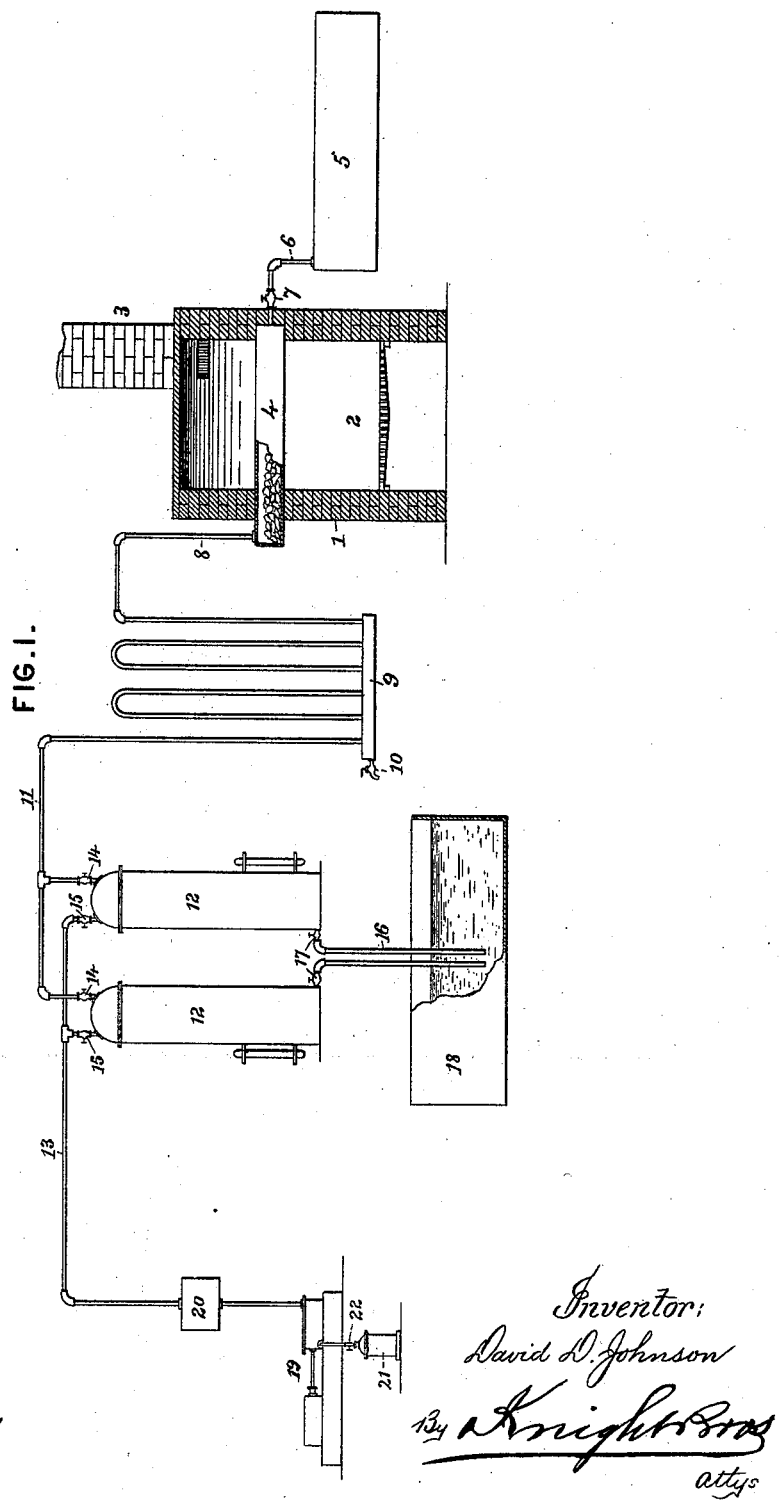

(No Model.) 2 Sheets—Sheet 2.
D. D. JOHNSON.
APPARATUS FOR OBTAINING LIQUID CARBON DIOXIDE.
No. 370,703. Patented Sept. 27, 1887.
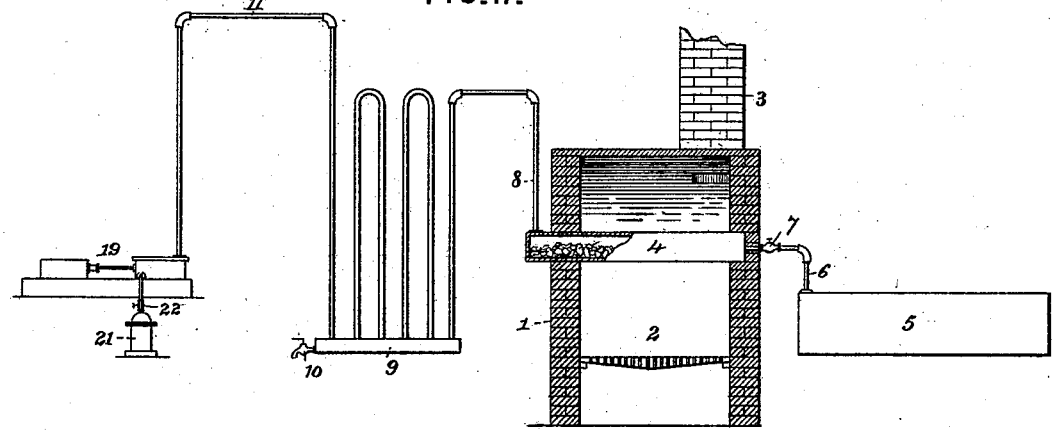
FIG. II.
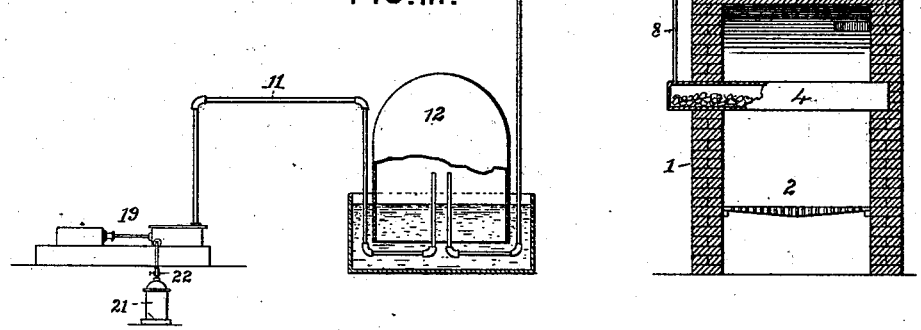
FIG. III.

UNITED STATES PATENT OFFICE.

DAVID D. JOHNSON, OF THE UNITED STATES ARMY.

APPARATUS FOR OBTAINING LIQUID CARBON DIOXIDE.

SPECIFICATION forming part of Letters Patent No. 370,703, dated September 27, 1887.

Application filed November 5, 1886. Serial No. 218,047. (No model.)

*To all whom it may concern:*

Be it known that I, DAVID D. JOHNSON, a citizen of the United States, and a lieutenant 5th Artillery, United States Army, have invented certain new and useful Improvements in the Process and Apparatus for Distilling Lime Carbonates and Collecting for Use Carbonic-Acid Gas given off therefrom, of which the following is a specification.

The objects of my invention are twofold, it being desired, first, to obtain lime in a pure state for the market, and, second, to obtain carbonic-acid gas in a pure state, and to collect it in such a manner as to render it capable of use in the arts. To these ends I distill limestone, marble, or other lime carbonates in such manner as to prevent the access of air or other products of combustion to the carbonate, and the carbonic-acid gas resulting from distillation I compress into suitable holders, in which it may be transported for use in any desired manner. By distilling the carbonate in an atmosphere of steam I find that the carbonic-acid gas is given off more readily and at a lower temperature than when the steam is not employed, and a similar result is obtained by carrying on the process of distillation in a partial vacuum.

In carrying out my invention I charge limestone or other carbonate into a closed retort, which may be similar to the retorts used for the production of illuminating-gas. To this retort neither the products of combustion of the furnace nor the nitrogen or other elements of the atmosphere are admitted; but steam generated in a suitable boiler, which may be heated by the waste heat of the retort-furnace, is supplied to the desired extent. The carbonic-acid gas and steam passing from the retort are led first through a condenser, which removes the steam. Thence the pure carbonic acid is drawn by what I term a "suction-gasometer," so arranged as to create a constant suction of the carbonic acid from the retort, and thus cause a partial vacuum therein. From this gasometer, which acts as a reservoir for the carbonic acid, the gas is drawn by a compression-pump, and is by the latter charged in a highly-compressed state into holders of such size as to be capable of convenient transportation. These holders have means of attachment to any apparatus in the operation of which the gas is employed, the flow of the compressed gas from the holder being under suitable regulation.

In order that my invention may be readily understood, I will proceed to describe it with reference to the accompanying drawings, in which is represented an apparatus capable of carrying out the improved process, and in which—

Figure I is a diagrammatic sectional elevation showing the entire apparatus. Fig. II is a similar view showing a modified form thereof; Fig. III, a similar view representing a further modification.

1 is a furnace having fire-chamber 2 and a stack, 3, for leading away the products of combustion. One or any number of retorts, 4, are mounted in the furnace and carefully closed to prevent the access of atmospheric air or other products of combustion of the furnace thereto.

5 is a boiler or steam-generator, which may be heated by the waste heat from the furnace 1, and which is connected by a pipe, 6, with the retort 4, so as to supply steam thereto under regulation of the cock 7. The limestone, marble, or other carbonate is charged into the heated retorts 4, and its distillation is carried on in contact with the steam from the generator 5. The retort or retorts 4 are connected by a pipe, 8, with a condenser, 9, which may be of any desired form. In this condenser the steam is separated out from the carbonic-acid gas, and the resulting water of condensation is removed by any suitable means—such, for example, as the tap or faucet 10. Pure carbonic-acid gas then passing from the condenser 9 through pipe 11 may pass into a reservoir or gasometer of any desired form. In Fig. 1 I have shown a form of suction-gasometer which, while acting as a reservoir for the gas, will operate to maintain a constant suction in the pipes leading from the retort, and thus create a partial vacuum in the latter. As here shown, this suction-gasometer consists of two cylindrical vessels, 12 12, each connected at top with the pipe 11, and also with a discharge-pipe, 13. Both the supply and discharge pipes of the vessels 12 are governed by cocks 14 15. The lower ends of the vessels 12 are provided with pipes 16, controlled by cocks 17, and dipping into the water of a large supply-tank, 18.

Supposing the apparatus to be in the condition shown in Fig. 1, with one vessel 12 full or about full, if the cock 14 of this vessel be turned so as to admit gas from the pipe 11, while its cock 15 is turned off, so as to prevent the escape of its gas through pipe 13, the water in this vessel, being allowed by turning cock 17 to fall into tank 18, placed below it, will gradually fill this vessel 12 with gas, and by causing a constant suction in pipe 11 condenser 9, pipe 8, and retort 4 will maintain a partial vacuum in the retort. The height of water in the vessel 12 may be indicated by means of a gage-tube in the customary manner. While this filling of one vessel 12 with gas is going on, the gas may be drawn off from the other vessel 12 through pipe 13. To this end the cock 14 of the second vessel 12, connecting with the pipe 11, is turned off and the cock 15, connecting with the pipe 13, turned on. As the gas is drawn off through the pipe 13, the cock 17 being also opened, water will rise through the pipe 16, and when the gas is finally exhausted from this vessel 12 the water will completely fill the same. This filling of one vessel 12 with gas and simultaneously emptying of the gas from the other vessel will be alternate, as will be readily understood; and, if preferred, instead of having the several cocks 14 15 operated by hand, there may be a simple system of floats and levers made to operate automatically, so that as soon as the water or gas has filled either vessel the necessary shifting of the cocks will take place. Gas is drawn through the pipe 13 by a gas-compressing pump, 19, having first passed through a drying-chamber, 20, in which is deposited any suitable material for removing moisture from the gas. By compressor 19 the gas is charged under heavy pressure into holders 21, which have couplings 22, to enable them to be connected to the large pipe of the compressor or to a discharge-pipe connected with any apparatus in which the carbonic acid is to be employed. These holders 21 are made of convenient size, so as to be capable of being readily transported from place to place. They are provided with means also of regulating the flow of the gas or for cutting off the flow completely when desired.

I have above detailed my complete apparatus. It is apparent, however, that some of the details thereof may be omitted or materially altered. I have shown, for example, in Fig. 2 an arrangement of apparatus in which the suction-gasometers 12 and their accessories are omitted. In this case the carbonic acid gas evolved in the presence of steam is conveyed from the condenser 9 directly to a compressor, 19, and it will not be necessary in this case to subject it to the further drying action of the chamber 20. (Shown in Fig. 1.) Here the compressor, being in direct connection with the retort, causes a vacuum therein proportionate to the amount of carbonic acid removed; but I may, instead of having this direct connection of the compressor and retort, pass the gas after it leaves the condenser 9 into a customary gas receiver or gasometer, from which it may be withdrawn as required by the compressor.

In Fig. 3, again, I have illustrated a modification in which the use of steam in connection with the distillation of the carbonate is dispensed with, and I have here shown another form of suction-gasometer. Both the pipe 11 and pipe 13 lead to and from the bell or dome 12 of this gasometer, and after passing through the edge thereof are bent up above the surface of the water, forming the seal of the gasometer. In this form the compressor 19 causes the rarefaction of the gas in the dome 12, which being supplied by the pipe 11 creates constantly a partial vacuum in the retort 4. In this form of gasometer the tank or dome does not rise and fall, as is ordinarily the case; but the water rises and falls in the dome according to the quantity of gas being drawn off by the compressing-engine 19.

Having thus described my invention, the following is what I claim as new therein and desire to secure by Letters Patent:

1. The apparatus for manufacturing pure lime and carbonic-acid gas and collecting the gas for use, which consists in a closed retort having means for admitting steam and lime carbonates thereto, the condenser connected with said retort so as to receive the carbonic-acid gas and steam therefrom, a receiver or reservoir connected with said condenser, having means for drawing the gas therefrom, a gas-pump for drawing the gas from said receiver, and one or more portable holders having means of connection with said gas-pump, substantially as set forth.

2. The apparatus for manufacturing pure lime and carbonic-acid gas, which consists of the combination of a retort having suitable means for heating for receiving lime carbonates and for discharging carbonic-acid gas, two receivers or reservoirs, each connected by pipes under control of suitable valves with the gas-discharge of said retort, means for drawing gas into said reservoirs alternately, a gas-pump having connection with each of said reservoirs or receivers under control of suitable valves, and one or more portable holders adapted to be connected with said gas-pump, substantially as set forth.

DAVID D. JOHNSON.

Witnesses:
HENRY C. JOHNSON,
K. McG. JOHNSON.